(12) United States Patent
Iwao et al.

(10) Patent No.: US 6,334,307 B1
(45) Date of Patent: Jan. 1, 2002

(54) FLUID COUPLING

(75) Inventors: Nobuyuki Iwao; Yasushi Yamamoto, both of Tokyo (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/629,889

(22) Filed: Jul. 31, 2000

(30) Foreign Application Priority Data

Aug. 4, 1999 (JP) ............................................. 11-221460

(51) Int. Cl.⁷ ............................................... F16D 31/02
(52) U.S. Cl. ........................................... 60/367; 60/330
(58) Field of Search ........................ 60/365, 330, 367; 416/180, 197 C, 228

(56) References Cited

U.S. PATENT DOCUMENTS

| | | | | |
|---|---|---|---|---|
| 2,216,747 A | * | 10/1940 | Klimek | ........................ 60/330 |
| 2,354,596 A | * | 7/1944 | Jandasek | ...................... 60/330 |
| 2,691,812 A | * | 10/1954 | Misch | .......................... 60/330 |
| 4,180,997 A | * | 1/1980 | Beardmore | ................... 60/342 |

* cited by examiner

Primary Examiner—F. Daniel Lopez
Assistant Examiner—Igor Kershteyn
(74) Attorney, Agent, or Firm—Antonelli, Terry, Stout & Kraus, LLP

(57) ABSTRACT

A fluid coupling comprising a pump including a pump shell having an annular core ring, and a plurality of impellers disposed in the pump shell; and a turbine including a turbine shell disposed opposite the pump and having an annular core ring, and a plurality of runners disposed in the turbine shell, wherein an annular baffle plate is mounted on an inner or outer periphery of the core ring of the pump shell or the core ring of the turbine.

4 Claims, 5 Drawing Sheets

FLUID COUPLING

FIELD OF THE INVENTION

This invention relates to an improvement on a fluid coupling for transmitting a rotating torque of a prime mover.

DESCRIPTION OF THE PRIOR ART

A fluid coupling has been used as a power transmission coupling for ships, industrial machinery, and automobiles. The fluid coupling comprises a pump having an annular pump shell, and a plurality of impellers disposed radially in the pump shell; and a turbine which has an annular turbine shell, and a plurality of runners disposed radially in the turbine shell and which is disposed opposite the pump. A working fluid is filled into the pump and the turbine. The so constituted fluid coupling has the pump connected to a crankshaft (an input shaft of the fluid coupling) of, for example, a diesel engine as a prime mover, and has the turbine attached to an output shaft disposed coaxially with the input shaft. There is also used a fluid coupling in which annular core rings for arranging the flow of the working fluid are provided in the pump shell and the turbine shell.

FIG. 6 shows the relationship between different revolution speeds of the input and output shafts and output torques (transmitted torques) in fluid couplings. In FIG. 6, a dashed line represents the torque transmission characteristics of a conventional fluid coupling. When a fluid coupling with such characteristics is installed in a driving device of a vehicle, the fluid coupling has a drag torque because of its characteristics, if the vehicle is at a stop, the engine is driven, and the transmission gear of a transmission is in mesh, namely, if the input shaft is rotated, while the output shaft is stopped. The drag torque generally refers to a transmitted torque when the engine is run at an idle speed (e.g., 500 rpm). This drag torque considerably increases, if the design point for the fluid coupling is set at a revolution speed ratio giving maximum efficiency, i.e., a pump-turbine revolution speed ratio in the range of from about 0.95 to 0.98. At a high drag torque, idle running of the engine is markedly unstable, and the unstable revolutions cause abnormal vibrations to a drive system. The high drag torque is also the cause of deteriorated fuel economy during idling.

As a measure for reducing the above-described drag torque, it is known to dispose a baffle plate between the pump and the turbine. The drag torque reducing measure using the baffle plate will be described with reference to FIGS. 7(a), 7(b) and 8. A fluid coupling shown in FIGS. 7(a) and 7(b) has an annular baffle plate BP disposed between a pump P and a turbine T and attached to an output shaft OS. A fluid coupling shown in FIG. 8 has an annular baffle plate BP disposed in an outer peripheral portion of a pump P.

In the fluid coupling shown in FIGS. 7(a) and 7(b), a working fluid given a rotational force by revolutions of the pump P at a low revolution speed flows into the turbine T from the outer peripheral side under a centrifugal force, as shown in FIG. 7(a). The working fluid that has driven the turbine T diminishes in the centrifugal force, approaches a core ring, and flows into the pump P. At a low revolution speed, therefore, the baffle plate BP disposed between the pump and the turbine exerts minimal effect, and cannot decrease the aforementioned drag torque. At a high revolution speed, the working fluid given a rotational force by revolutions of the pump P shown in FIG. 7(b) flows into the turbine T from the outer peripheral side under a centrifugal force. However, the working fluid flowing into the turbine T has a strong centrifugal force, and flows along the inner surface of the turbine shell. Thus, the working fluid contacts the baffle plate BP when entering the pump P. During high-speed revolutions, therefore, the baffle plate BP acts conspicuously, decreasing the transmitted torque (coupling efficiency). The torque transmission characteristics of the fluid coupling illustrated in FIGS. 7(a) and 7(b) are indicated by a one-dot chain line in FIG. 6. As discussed here, the fluid coupling shown in FIGS. 7(a) and 7(b) is a low efficiency coupling which not only is unable to reduce the drag torque that should be decreased at a low revolution speed, for example, during idle running of the engine, but also decreases the transmitted torque (coupling efficiency) at a high revolution speed. This problem is pronounced in a fluid coupling having core rings provided in the pump shell and the turbine shell.

The fluid coupling shown in FIG. 8, on the other hand, can reduce a drag torque at a low revolution speed, because the annular baffle plate BP is disposed in the outer peripheral portion of the pump P. However, this fluid coupling drastically decreases a transmitted torque at a high revolution speed. The torque transmission characteristics of the fluid coupling illustrated in FIG. 8 are indicated by a two-dot chain line in FIG. 6. That is, the working fluid given a rotating force by rotations of the pump P flows beside the outer periphery under a centrifugal force. However, when flowing out of the pump P at a peak flow velocity, the working fluid collides with the baffle plate BP to decline in flow velocity, and then flows into the turbine T. Thus, the transmitted torque (coupling efficiency) is sharply decreased during high speed rotations.

SUMMARY OF THE INVENTION

The object of the present invention is to provide a fluid coupling capable of effectively reducing a drag torque without decreasing a transmitted torque.

According to the invention, designed to attain the above object, there is provided a fluid coupling comprising:

a pump including a pump shell having an annular core ring, and a plurality of impellers disposed in the pump shell; and a turbine including a turbine shell disposed opposite the pump and having an annular core ring, and a plurality of runners disposed in the turbine shell, wherein:

an annular baffle plate is mounted on an inner periphery of the core ring of the pump shell at an end portion of the core ring of the pump shell opposed to the turbine.

According to the invention, there is also provided the same fluid coupling, wherein:

an annular baffle plate is mounted on an outer periphery of the core ring of the pump shell at an end portion of the core ring of the pump shell opposed to the turbine.

According to the invention, there is also provided the same fluid coupling, wherein:

an annular baffle plate is mounted on an inner periphery of the core ring of the turbine at an end portion of the core ring of the turbine opposed to the pump shell.

According to the invention, there is also provided the same fluid coupling, wherein:

an annular baffle plate is mounted on an outer periphery of the core ring of the turbine at an end portion of the core ring of the turbine opposed to the pump shell.

DETAILED DESCRIPTION OF THE PREFERRED EMBODIMENTS

The present invention will now be described in more detail with reference to the accompanying drawings showing preferred embodiments of a fluid coupling constituted in accordance with the invention.

Figure 1:
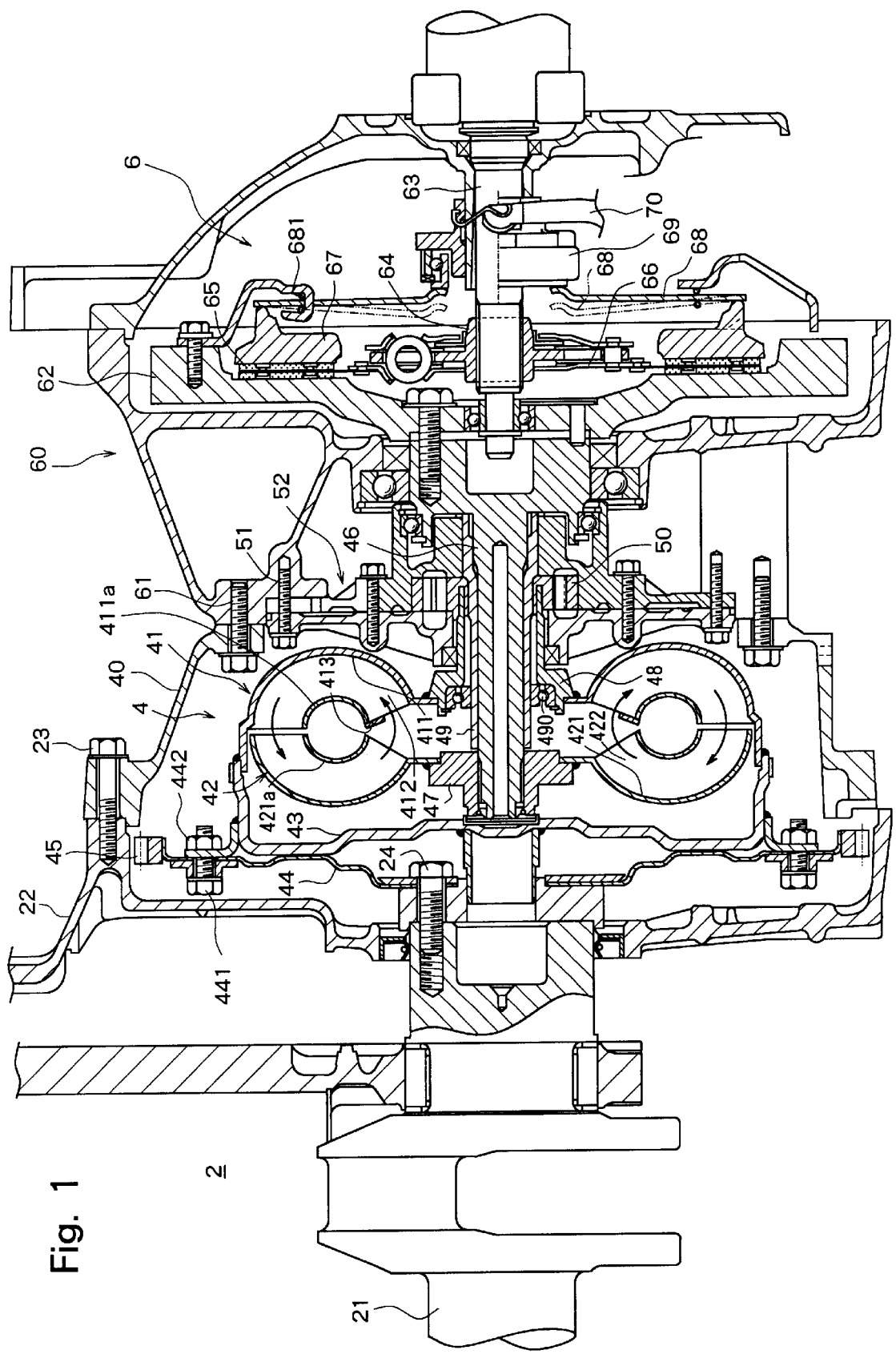
FIG. 1 is a sectional view showing an embodiment of a driving device equipped with a fluid coupling in a first embodiment constituted in accordance with the present invention.

FIG. 1 shows an embodiment of a driving device in which a fluid coupling constituted in accordance with the present invention is disposed between an automobile engine and a friction clutch. The driving device in the illustrated embodiment is composed of an internal combustion engine 2 as a prime mover, a fluid coupling 4 constituted in accordance with the invention, and a friction clutch 6. The internal combustion engine 2 comprises a diesel engine in the illustrated embodiment, and has an end portion of a crankshaft 21 attached to a later-described pump side of the fluid coupling 4.

The fluid coupling 4 is disposed in a fluid coupling housing 40 attached by fastening means, such as a bolt 23, to a housing 22 mounted on the diesel engine 2. The fluid coupling 4 in the illustrated embodiment includes a pump 41, a turbine 42 disposed opposite the pump 41, and a casing 43 coupled to the pump 41.

The pump 41 constituting the fluid coupling 4 includes a bowl-shaped pump shell 411 having an annular core ring 411a, and a plurality of impellers 412 disposed radially inside the pump shell 411. The pump shell 411 is attached to the casing 43 by bonding means such as welding. The casing 43 is mounted by fastening means, such as bolts 441 and nuts 442, to an outer peripheral portion of a drive plate 44 having an inner peripheral portion mounted by a bolt 24 to the crankshaft 21. In this manner, the pump shell 411 of the pump 41 is connected to the crankshaft 21 via the casing 43 and the drive plate 44. Therefore, the crankshaft 21 functions as an input shaft of the fluid coupling 4. On the outer periphery of the drive plate 44, a starting ring gear 45 meshing with a driving gear of a starter motor (not shown) is mounted.

The turbine 42 includes a bowl-shaped turbine shell 421 disposed opposite the pump shell 411 of the pump 41 and having an annular core ring 421a, and a plurality of runners 422 disposed radially inside the turbine shell 421. The turbine shell 421 is attached by bonding means, such as welding, to a turbine hub 47 splined to an output shaft 46 disposed coaxially with the crankshaft 21 as the input shaft.

The fluid coupling 4 in the first embodiment illustrated in FIG. 1 has an annular baffle plate 413 mounted, by bonding means such as welding, on an inner periphery of the core ring 411a of the pump 41 at an end portion of the core ring 411a of the pump 41 opposed to the turbine 42. The baffle plate 413 is disposed in such a manner as to protrude into a fluid passage formed in the fluid coupling 4.

Referring to FIG. 1, the fluid coupling 4 in the illustrated embodiment includes a hydraulic pump 50. The hydraulic pump 50 is disposed in a pump housing 52 attached by bonding means, such as bolts 51, to a clutch housing 60 (to be described later on) of the friction clutch 6 mounted on the fluid coupling housing 40. The hydraulic pump 50 is adapted to be rotationally driven by a pump hub 48 attached to the pump shell 411 of the pump 41, and supplies a working fluid into the pump 41 and the turbine 42 via a fluid path (not shown). The pump hub 48 is supported rotatably by a bearing 490 on a tubular shaft 49 disposed so as to fit around the output shaft 46.

Next, the friction clutch 6 will be described. The friction clutch 6 is disposed in the clutch housing 60 mounted to the fluid coupling housing 40 by a bolt 61. The friction clutch 6 in the illustrated embodiment includes a clutch drive plate 62 mounted on the output shaft 46 of the fluid coupling 4; a transmission shaft 63 (an input shaft of a transmission (not shown) in the illustrated embodiment) disposed coaxially with the output shaft 46; a driven plate 66 attached to a clutch hub 64 splined to the transmission shaft 63, and having a clutch facing 65 mounted on an outer peripheral portion thereof; a pressure plate 67 for pressing the driven plate 66 against the clutch drive plate 62; a diaphragm spring 68 for urging the pressure plate 67 toward the clutch drive plate 62; a release bearing 69 which engages with an inner end portion of the diaphragm spring 68 to actuate the diaphragm spring 68 with an intermediate portion of the diaphragm spring 68 as a fulcrum 681; and a clutch release fork 70 for actuating the release bearing 69 in an axial direction. In the so constituted friction clutch 6, when in the illustrated state, the pressure plate 67 is pushed toward the clutch drive plate 62 by the spring force of the diaphragm spring 68. Thus, the clutch facing 65 mounted on the driven plate 66 is pressed against the clutch drive plate 62. As a result, power transmitted to the output shaft 46 of the fluid coupling 4 is transmitted to the transmission shaft 63 via the clutch drive plate 62 and the driven plate 66. To cut off this power transmission, a hydraulic pressure is supplied to a slave cylinder (not shown) to actuate the clutch release fork 70, whereby the release bearing 69 is moved leftward in FIG. 1. By this movement, the diaphragm spring 68 is actuated as indicated by a two-dot chain line in the drawing to release the pushing force imposed on the pressure plate 67. Consequently, power transmission from the clutch drive plate 62 to the driven plate 66 is broken.

The driving device equipped with the fluid coupling according to the present invention is constituted as described above. Its actions will be explained.

A driving force which has occurred in the crankshaft 21 (input shaft) of the diesel engine 2 is transmitted to the casing 43 of the fluid coupling 4 via the drive plate 44. Since the casing 43 and the pump shell 411 of the pump 41 are integrally constituted, the pump 41 is rotated by the driving force. Upon rotation of the pump 41, the working fluid in the pump 41 flows toward the outer periphery along the impellers 412 under a centrifugal force, and flows into the turbine 42 as shown by an arrow. The working fluid that has flowed into the turbine 42 flows toward the center, and is then returned to the pump 41 as shown by an arrow. Since the working fluid inside the pump 41 and the turbine 42 circulates between the pump 41 and the turbine 42 in this manner, driving torque of the pump 41 is transmitted to the turbine 42 via the working fluid. The driving force transmitted to the turbine 42 is transmitted to the output shaft 46 via the turbine shell 421 and the turbine hub 47, and is further transmitted to the transmission (not shown) via the friction clutch 6.

The flow of the working fluid inside the fluid coupling 4 will be described with reference to FIGS. 2(a) and 2(b).

FIG. 2(a) shows the flow of the working fluid while the fluid coupling 4 is rotating at a low speed. During low speed rotations, the working fluid given a rotational force by the revolutions of the pump 41 flows into the turbine 42 from the outer peripheral side of the fluid passage under a centrifugal force, as shown by arrows. The working fluid that has driven the turbine 42 has a centrifugal force decaying as shown by arrows, approaches the core ring 411a, and flows into the pump 41. As stated earlier, the annular baffle plate 413 is mounted on the inner periphery in the end portion of the core ring 411a opposed to the turbine 42. Since the working fluid collides with the baffle plate 413 to diminish in flow velocity, the transmitted torque decreases. At a low revolution speed, therefore, the baffle plate 413 acts effectively, and can reduce the drag torque.

FIG. 2(b) shows the flow of the working fluid while the fluid coupling 4 is rotating at a high speed. During high speed rotations, the working fluid given a rotational force by the revolutions of the pump 41 flows into the turbine 42 from the outer peripheral side of the fluid passage under a centrifugal force, as shown by arrows. However, the working fluid flowing into the turbine 42 has a strong centrifugal force, and flows along the inner surface of the turbine shell 421 as shown by arrows. That is, the high flow velocity working fluid flowing along the inner surface of the turbine shell 421 flows into the pump 41 without undergoing the action of the baffle plate 413, so that no decrease in the transmission efficiency is induced.

Figure 2:
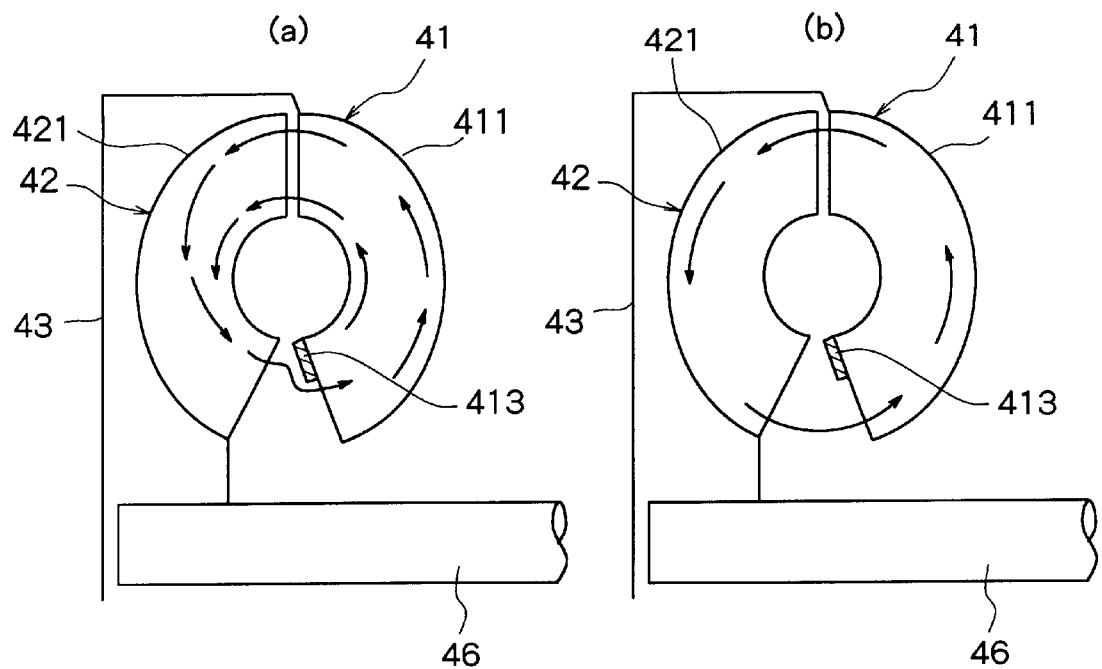
FIGS. 2(a) and 2(b) are explanatory drawings showing the flow of a working fluid inside the fluid coupling in the first embodiment shown in FIG. 1.
Figure 6:
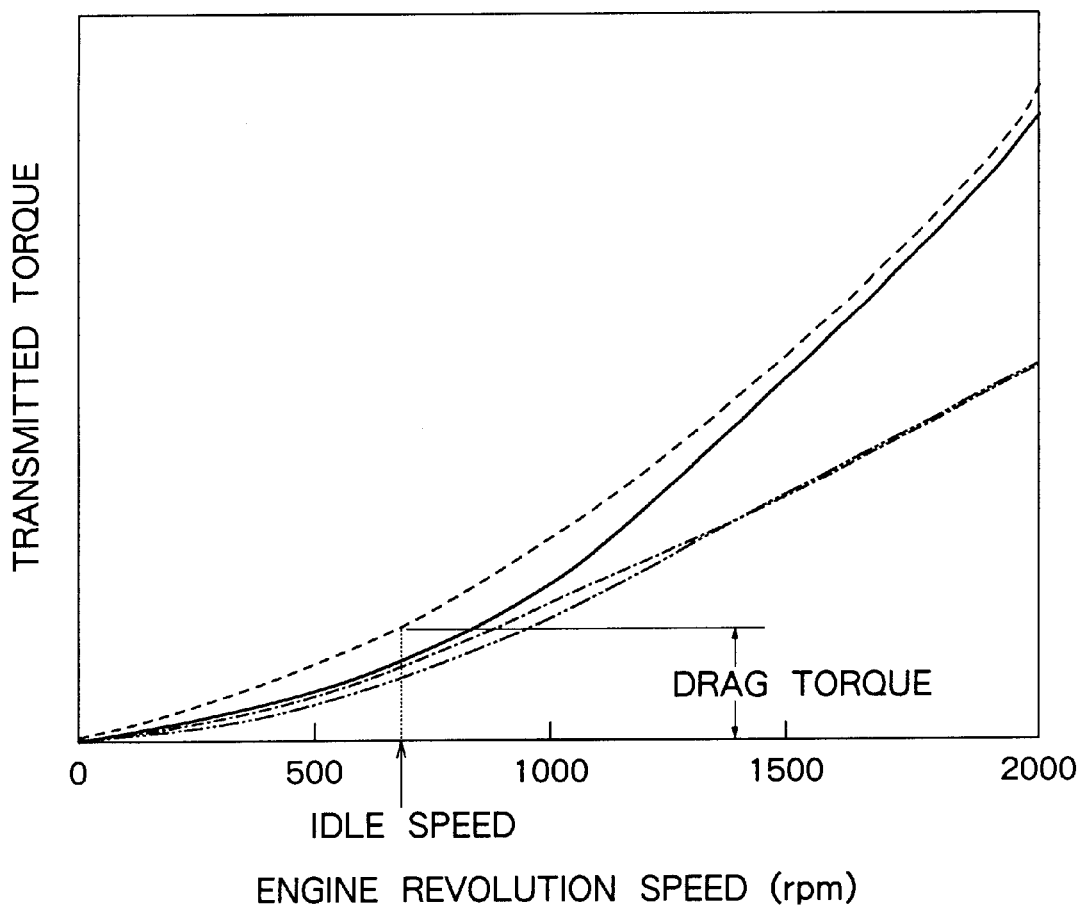
FIG. 6 is a graph showing the relation between different revolution speeds of input and output shafts and transmitted torques in fluid couplings.
Figure 7:
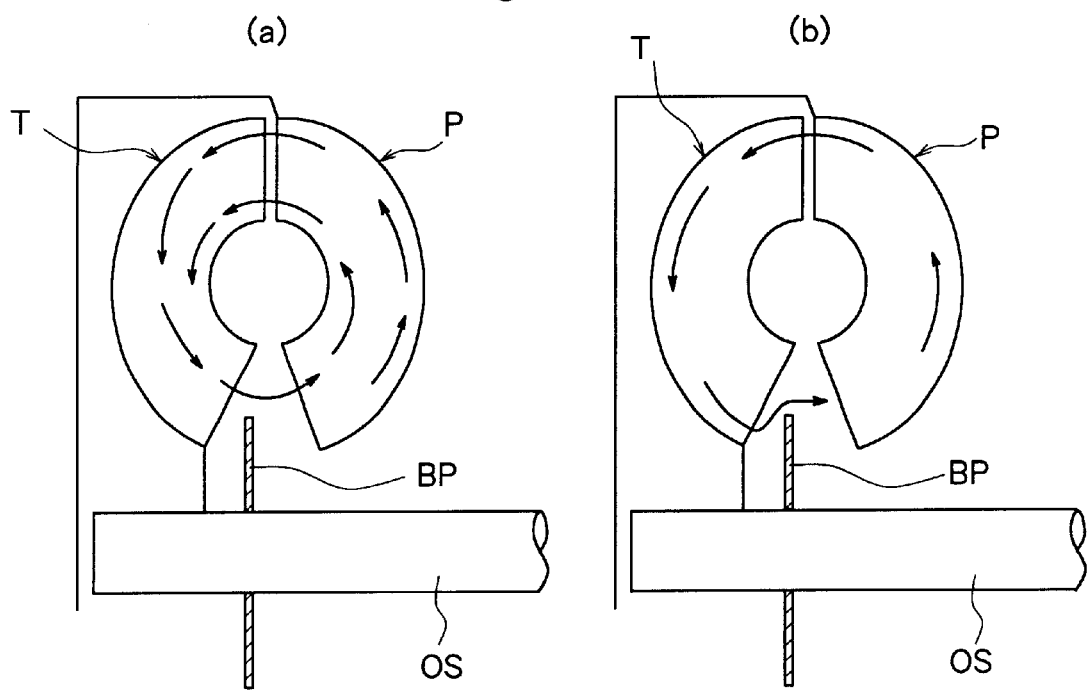
FIGS. 7(a) and 7(b) are explanatory drawings showing the flow of a working fluid inside an example of a conventional fluid coupling.
Figure 8:
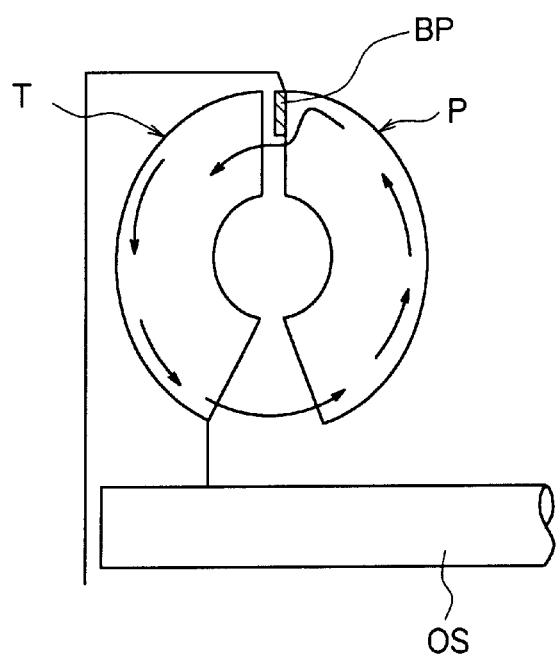
FIG. 8 is an explanatory drawing showing the flow of a working fluid inside another example of a conventional fluid coupling.

The torque transmission characteristics of the fluid coupling 4 in the first embodiment illustrated in FIGS. 1 and 2 are indicated by a solid line in FIG. 6. As shown here, the fluid coupling 4 in the embodiment shown in FIG. 1 can reduce the drag torque, because the baffle plate 413 acts effectively at a low revolution speed. At a high revolution speed, this fluid coupling 4 does not lead to a decrease in the transmission efficiency, because of minimal influence of the baffle plate 413.

Next, the second embodiment of the invention will be described with reference to FIGS. 3(a) and 3(b). A fluid coupling 4 in the second embodiment illustrated in FIGS. 3(a) and 3(b) has an annular baffle plate 414 mounted, by bonding means such as welding, on an outer periphery of a core ring 411a of a pump 41 at an end portion of the core ring 411a of the pump 41 opposed to a turbine 42. The baffle plate 414 is disposed in such a manner as to protrude into a fluid passage formed in the fluid coupling 4.

Figure 3:
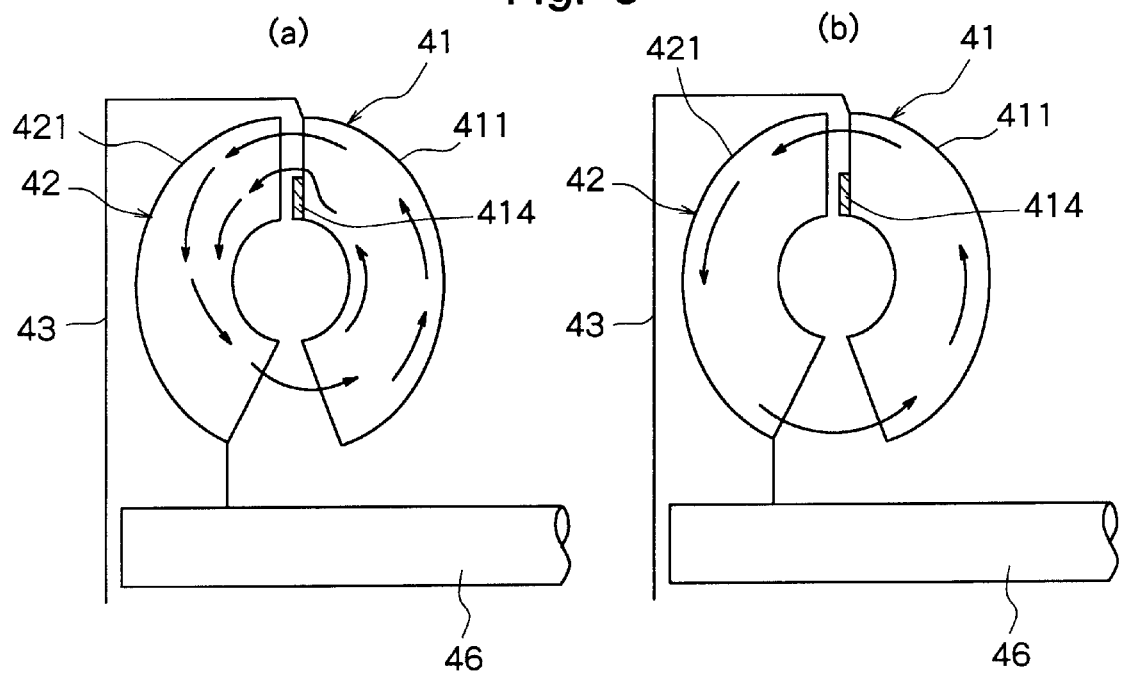
FIGS. 3(a) and 3(b) are explanatory drawings showing the flow of a working fluid inside a fluid coupling in a second embodiment constituted in accordance with the present invention.

FIG. 3(a) shows the flow of the working fluid while the fluid coupling 4 is rotating at a low speed. During low speed rotations, the working fluid given a rotational force by the revolutions of the pump 41 flows into the turbine 42 as shown by arrows. At a low revolution speed, the working fluid given the rotational force by the revolutions of the pump 41 has a low centrifugal force, and the amount of the working fluid flowing beside the inner periphery of the fluid passage is also large. As stated earlier, the annular baffle plate 414 is mounted on the outer periphery of the core ring 411a. Thus, the working fluid flowing beside the inner periphery of the fluid passage collides with the baffle plate 414 to have its flow velocity diminished. At the diminished flow velocity, the working fluid flows into the turbine 42, so that the transmitted torque decreases. At a low revolution speed, therefore, the baffle plate 414 acts effectively, and can reduce the drag torque.

FIG. 3(b) shows the flow of the working fluid while the fluid coupling 4 is rotating at a high speed. During high speed rotations, the working fluid given a rotational force by the revolutions of the pump 41 has a strong centrifugal force, and so flows into the turbine 42 from the outer peripheral side of the fluid passage as shown by arrows. The high flow velocity working fluid flowing into the turbine 42 from the outer peripheral side of the fluid passage flows into the turbine 42 without undergoing the action of the baffle plate 414, so that no decrease in the transmission efficiency is induced.

Next, the third embodiment of the invention will be described with reference to FIGS. 4(a) and 4(b). A fluid coupling 4 in the third embodiment illustrated in FIGS. 4(a) and 4(b) has an annular baffle plate 423 mounted, by bonding means such as welding, on an inner periphery of a core ring 421a of a turbine 42 at an end portion of the core ring 421a of the turbine 42 opposed to a pump 41. The baffle plate 423 is disposed in such a manner as to protrude into a fluid passage formed in the fluid coupling 4.

Figure 4:
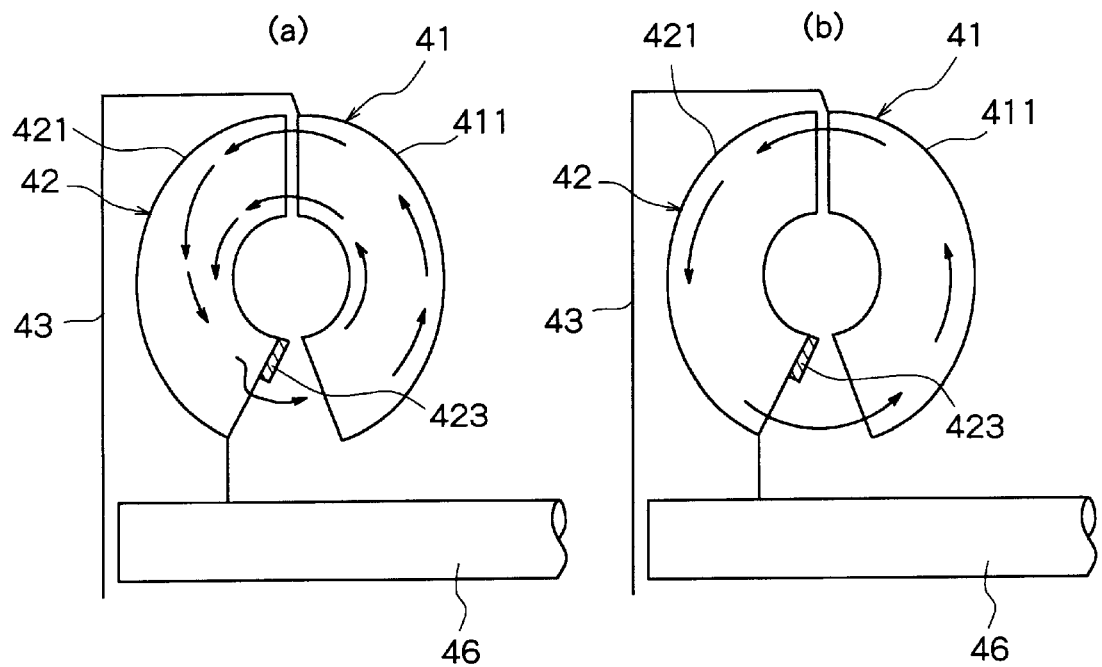
FIGS. 4(a) and 4(b) are explanatory drawings showing the flow of a working fluid inside a fluid coupling in a third embodiment constituted in accordance with the present invention.

FIG. 4(a) shows the flow of the working fluid while the fluid coupling 4 is rotating at a low speed. During low speed rotations, the working fluid given a rotational force by the revolutions of the pump 41 flows into the turbine 42 as shown by arrows. At a low revolution speed, the working fluid given the rotational force by the revolutions of the pump 41 flows into the turbine 42 from the outer peripheral side of the fluid passage under a centrifugal force as shown by arrows. The working fluid that has driven the turbine 42 has a centrifugal force decaying as shown by arrows, approaches the core ring 411a, and flows into the pump 41. As stated earlier, the annular baffle plate 423 is mounted on the inner periphery of the core ring 421a at the end portion of the core ring 421a opposed to the pump 41. Thus, the working fluid collides with the baffle plate 423 to have its flow velocity diminished, so that the transmitted torque decreases. At a low revolution speed, therefore, the baffle plate 423 acts effectively, and can reduce the drag torque.

FIG. 4(b) shows the flow of the working fluid while the fluid coupling 4 is rotating at a high speed. During high speed rotations, the working fluid given a rotational force by the revolutions of the pump 41 has a strong centrifugal force, and so flows into the turbine 42 from the outer peripheral side of the fluid passage as shown by arrows. Such a high flow velocity working fluid flowing into the turbine 42 from the outer peripheral side of the fluid passage flows into the turbine 42 without undergoing the action of the baffle plate 423, so that no decrease in the transmission efficiency is induced.

Next, the fourth embodiment of the invention will be described with reference to FIGS. 5(a) and 5(b). A fluid coupling 4 in the fourth embodiment illustrated in FIGS. 5(a) and 5(b) has an annular baffle plate 424 mounted, by bonding means such as welding, on an outer periphery of a core ring 421a of a turbine 42 at an end portion of the core ring 421a of the turbine 42 opposed to a pump 41. The baffle plate 424 is disposed in such a manner as to protrude into a fluid passage formed in the fluid coupling 4.

Figure 5:
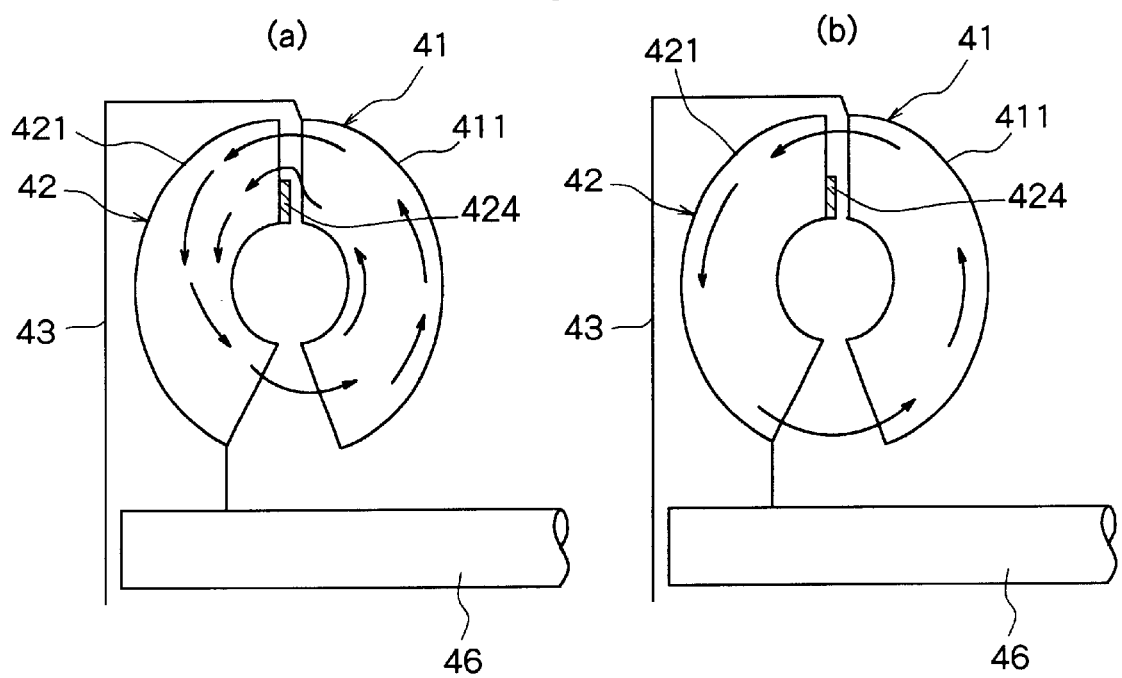
FIGS. 5(a) and 5(b) are explanatory drawings showing the flow of a working fluid inside a fluid coupling in a fourth embodiment constituted in accordance with the present invention.

FIG. 5(a) shows the flow of the working fluid while the fluid coupling 4 is rotating at a low speed. During low speed rotations, the working fluid given a rotational force by the revolutions of the pump 41 flows into the turbine 42 as shown by arrows. At a low revolution speed, the working fluid given the rotational force by the revolutions of the pump 41 has a low centrifugal force, and the amount of the working fluid flowing beside the inner periphery of the fluid passage is also large. As stated earlier, the annular baffle plate 424 is mounted on the outer periphery of the core ring 421a. Thus, the working fluid flowing beside the inner periphery of the fluid passage collides with the baffle plate 424 to have its flow velocity diminished. At the diminished flow velocity, the working fluid flows into the turbine 42, so that the transmitted torque decreases. At a low revolution speed, therefore, the baffle plate 423 acts effectively, and can reduce the drag torque.

FIG. 5(b) shows the flow of the working fluid while the fluid coupling 4 is rotating at a high speed. During high speed rotations, the working fluid given a rotational force by the revolutions of the pump 41 has a strong centrifugal force, and so flows into the turbine 42 from the outer peripheral side of the fluid passage as shown by arrows. Such a high flow velocity working fluid flowing into the turbine 42 from the outer peripheral side of the fluid passage enters the turbine 42 without undergoing the action of the baffle plate 424, so that no decrease in the transmission efficiency is induced.

Since the fluid coupling according to the invention is constituted as described above, it exhibits the following actions and effects:

According to the first invention, the annular baffle plate is mounted on the inner periphery in the end portion, opposed to the turbine, of the core ring of the pump shell constituting the pump of the fluid coupling. Thus, at a low revolution speed, the baffle plate acts effectively, and can reduce the drag torque. Whereas at a high revolution speed, the baffle plate exerts minimal influence, and does not decrease the transmission efficiency.

According to the second invention, the annular baffle plate is mounted on the outer periphery in the end portion, opposed to the turbine, of the core ring of the pump shell constituting the pump of the fluid coupling. Thus, the same actions and effects as in the first invention are obtained.

According to the third invention, the annular baffle plate is mounted on the inner periphery in the end portion, opposed to the pump, of the core ring of the turbine shell constituting the turbine of the fluid coupling. Thus, the same actions and effects as in the first and second inventions are obtained.

According to the fourth invention, the annular baffle plate is mounted on the outer periphery in the end portion, opposed to the pump, of the core ring of the turbine shell constituting the turbine of the fluid coupling. Thus, the same actions and effects as in the first to third inventions are obtained.

What we claim is:

1. A fluid coupling comprising:

a pump including a pump shell having an annular core ring, and a plurality of impellers disposed in the pump shell; and a turbine including a turbine shell disposed opposite the pump and having an annular core ring, and a plurality of runners disposed in the turbine shell, wherein:

an annular baffle plate is mounted on an inner periphery of the core ring of the pump shell at an end portion of the core ring of the pump shell opposed to the turbine.

2. A fluid coupling comprising:

a pump including a pump shell having an annular core ring, and a plurality of impellers disposed in the pump shell; and a turbine including a turbine shell disposed opposite the pump and having an annular core ring, and a plurality of runners disposed in the turbine shell, wherein:

an annular baffle plate is mounted on an outer periphery of the core ring of the pump shell at an end portion of the core ring of the pump shell opposed to the turbine.

3. A fluid coupling comprising:

a pump including a pump shell having an annular core ring, and a plurality of impellers disposed in the pump shell; and a turbine including a turbine shell disposed opposite the pump and having an annular core ring, and a plurality of runners disposed in the turbine shell, wherein:

an annular baffle plate is mounted on an inner periphery of the core ring of the turbine at an end portion of the core ring of the turbine opposed to the pump shell.

4. A fluid coupling comprising:

a pump including a pump shell having an annular core ring, and a plurality of impellers disposed in the pump shell; and a turbine including a turbine shell disposed opposite the pump and having an annular core ring, and a plurality of runners disposed in the turbine shell, wherein:

an annular baffle plate is mounted on an outer periphery of the core ring of the turbine at an end portion of the core ring of the turbine opposed to the pump shell.

* * * * *